Jan. 5, 1960     D. L. BECHTEL     2,919,942

BEARING CONSTRUCTION

Filed Oct. 24, 1955

INVENTOR.
DANIEL L. BECHTEL

BY

ATTORNEY.

United States Patent Office 2,919,942
Patented Jan. 5, 1960

2,919,942

BEARING CONSTRUCTION

Daniel L. Bechtel, Fort Worth, Tex., assignor to General Dynamics Corporation, San Diego, Calif., a corporation of Delaware Application October 24, 1955, Serial No. 542,200

1 Claim. (Cl. 287—96)

The present invention relates generally to an improved bearing construction. More particularly, the invention relates to bearing construction which provides a non-backlash type of mechanical pivot joint. Such a construction may readily be embodied in anti-friction bearings, self-aligning (spherical) bearings, sleeve bushings, shoulder bushings, clamp-up (spacer type) bushings and the like, and is particularly suited for employment in any precision mechanical linkage or other construction where backlash is undesirable.

In a conventional pivotal joint construction of this general class, normal manufacturing and assembly tolerances between the pin or fastener and the bearing bore may be accumulative, resulting in "play," "slop" or looseness in fitting. Relative motion between the connected parts of a linkage or mechanical system, resulting from such accumulative tolerance or clearance, is commonly referred to as "backlash."

The invention is exemplified in connection with an aircraft primary control system. Modern high-speed aircraft require such precision control, that any appreciable backlash in the mechanical control system linkage could very well result in loss of the aircraft. This statement is based on the fact that modern high-speed aircraft, operating at high subsonic speeds and under conditions of high dynamic pressure and low static stability, are extremely sensitive to longitudinal control motion. For example, under these stated conditions, it is entirely possible that as little as one-fourth of one degree (¼°) of control surface angular travel would impose an additional "one-G" load on the aircraft, which could have extremely deleterious effects on the aircraft. It should therefore be readily apparent that the desired performance (stability and control) of such a high-speed aircraft is predicated upon a precision control system which tolerates no backlash. The minute amount of control surface movement required to effect a change in the aircraft's attitude, in such a precision control system operating under the aforementioned conditions, is normally associated with linkage travel measured in mere thousandths of an inch. Although a conventional pivot or joint construction may have only a small clearance or backlash, the number of such pivotal connections required in a high-speed aircraft's control system could have a final accumulative result of an intolerable amount of backlash.

The requirement for such an anti-backlash precision aircraft control system may be further illustrated in another manner. For example, a sensitive aneroid barometer in the primary control system may indicate to the autopilot servomechanism a deviation in the aircraft's altitude of 20 feet. This autopilot servo then relays a signal to command one-tenth of one degree (1/10°) corrective elevator travel to thereby return the aircraft to its original altitude. The electrical or electronic control sensing units frequently employed in conjunction with the mechanical linkage system may be extremely sensitive and accurate; yet, the resolution of a conventional system as a whole is such that the accumulative backlash in the mechanical linkage may result in a zero degree elevator travel, rather than the corrective one-tenth of one degree signalled by the autopilot servo-mechanism. This results in the continued travel of the aircraft on the erroneous course. It should be readily apparent that this conventional type of pivot or joint construction in a primary control system is inadequate for such high-speed aircraft as exist today, where such extreme accuracy and sensitivity are required at high subsonic or supersonic operational speeds, that it is imperative for said primary control system to have potential backlash substantially eliminated, so that said control system may function as intended under all operating loads.

An object of the present invention is to provide an improved bearing construction adapted to effect a precision fitted, non-backlash type of pivot or joint construction.

Another object of the invention is to provide an improved bearing construction which is capable of assuming radial loads without movement of the bearing relative to its mounting structure, and independent of its shaft or fastener size and clearances.

Another object of the invention is to provide a bearing construction of the above class and character which is completely interchangeable with standard parts presently employed in aircraft mechanical linkage systems.

Another object of the invention is to provide a bearing construction of the above type which lends itself readily to field usage (for replacement, etc.), while furthermore being readily adaptable to factory production-line techniques, since its inherent characteristics eliminate the need for selective fits (conventional tolerances may be employed, as opposed to precision tolerances required for press fits, etc.).

A further object of the invention is to provide, in anti-friction devices, a bearing construction of this class and character, which, upon installation, has its internal radial tolerance (such as ball, roller or needle clearance) unaffected by assembly procedures, whereas other precision installation methods, such as press fits, collets, expanding mandrels, etc., have a tendency to bind conventional bearings by distortion and subsequent elimination of this internal radial clearance.

A further object of the invention is to provide a means whereby normal or general shop techniques may be employed for assembly and disassembly, as opposed to special tools or novel techniques heretofore required to be employed in this general type of precision pivotal joint construction.

Another object of the invention is to provide, in the case of anti-friction devices such as ball bearings, roller bearings, needle bearings and spherical (self-aligning) bearings, a closer-than-normal internal radial tolerance in the bearing itself, to eliminate as much backlash as possible in the pivot or joint construction.

Another object of the invention is to provide a means whereby the inherent physical characteristics of the bearing construction readily permit rapid identification of this type bearing, as opposed to ordinary, non-close-tolerance stock bearings.

A further object of the invention is that the knife-edge construction inherently provides a greater chamfer on the bearing bore, which permits a more facile alignment of the pin or fastener with said bearing bore.

The invention consists in the several novel features which are hereinafter set forth, and other objects and advantages will become more readily apparent from the following description of the appended drawings, wherein.

Figure 3:
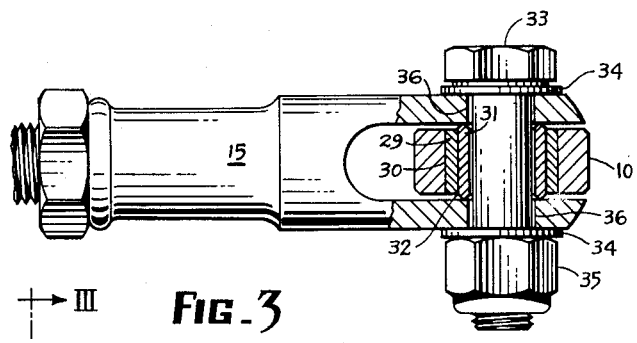
Figure 3 is an enlarged sectional view illustrating a clevis-type rod-end fitting pivotally connected to the tongued end of the bellcrank, employing a plain sleeve bushing which embodies the improved bearing construction of the present invention, and taken along line III—III of Figure 1.
Figure 1:
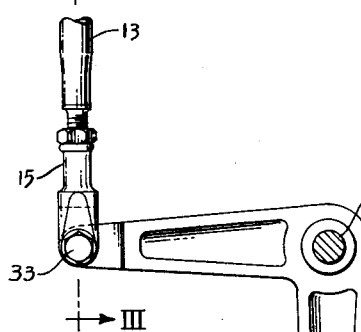
Figure 1 is a plan view of a portion of a control system illustrating a bellcrank with control rods or linkages pivotally attached thereto and embodying the present invention.

Having reference now to Figure 1, the improved bearing construction of the present invention is exemplified in connection with an aircraft primary control system. An L-shaped bellcrank 10 is adapted to operate in a conventional manner on shaft 11, and has control rods or linkages 12 and 13 pivotally connected to each of its outer ends by means of fittings 14 and 15 respectively. The control rods 12 and 13 are shown herein as tubular members, with fittings 14 and 15, of a type common to present-day aircraft construction, adjustably attached to their ends. The type of pivotal construction illustrated in Figure 3 is not customarily employed in a precision control system (since this type connection does not embody an optimum anti-friction device), but is shown herein as a suitable connection only to exemplify another application of the knife-edge locking principle embodied in the bearing construction of the present invention.

Figure 2:
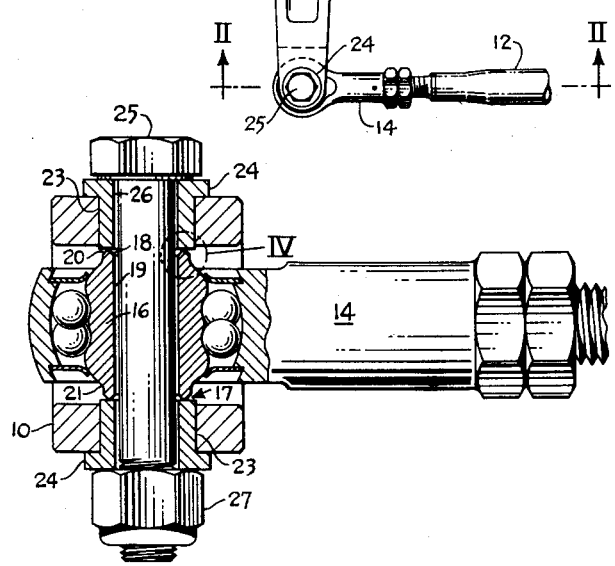
Figure 2 is an enlarged sectional view illustrating a self-aligning, rod-end ball bearing, which embodies the improved bearing construction of the present invention, pivotally connected to the bifurcated end of the bellcrank, taken along line II—II of Figure 1.

Referring now to Figures 1 and 2, the fitting 14 which comprises the means for pivotally connecting the tubular rod 12 to the bifurcated end of bellcrank 10 is shown as a self-aligning rod-end ball bearing. The outer ends of the inner race or annular member 16 of this rod-end ball bearing 14 are essentially a V-shaped protuberance 17 where the surface at the apex of the V effects substantially an annular knife-edge construction. This construction is more clearly illustrated and drawn to a larger scale in Figure 4. The annular V-shaped protuberance or configuration 17 (Figures 2 and 4) may be effected by increasing the customary chamfer 18 (Figure 4) on the bore 19 of said bearing 14 (if necessary, depending upon the size of the bearing under consideration), and machining a chamfer 30 on the outer peripheral corner of the hub 21 of said inner race 16. The annular V-shaped configuration 17 thus effected by chamfers 18 and 20 terminates at the vertex or apex of the V in a sharp, knife-like edge. The surface along the knife-like edge forms the bearing and gouging surface. However, in the preferred embodiment of the invention, which is illustrated herein and most clearly shown in Figure 4, the chamfers 18 and 20 terminate at the apex of the V-shaped configuration 17 in a narrow flat surface 22, preferably having a width on the order of .002″. This narrow flat surface 22 enables the length of the inner race 16 to be more closely controlled, since in its absence, any eccentricity between the chamfers 18 and 20 would cause variations in the length of said inner race 16, and possibly non-parallel end faces. Preferably, the surface at or adjacent to the apex of the V-configuration 17 should be of a hardness greater than the surface with which it is adapted to cooperate.

Figure 4:
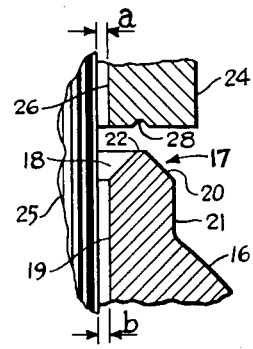
Figure 4 is a fragmentary detailed sectional view, greatly enlarged, illustrating the knife-edge construction of the present invention, as indicated by detail IV in Figure 2.

Figure 2 illustrates the method of connecting the rod-end ball bearing 14 to the bifurcated end of bellcrank 10. Each of these bifurcated end portions of the bellcrank 10 is vertically and circularly apertured 23 in an aligned manner to receive one of a pair of opposing, flanged, shoulder-type bushings 24. These bushings 24 are adapted to be pressed into apertures 23 so their flanges respectively bear on the upper and lower surfaces of bellcrank 10, and the bushings 24 are then considered to be permanently assembled in said bellcrank 10. The distance between the inner opposing faces of bushings 24 is only slightly greater than the overall length of the inner race 16 of bearing 14. The inner race 16 of the rod-end ball bearing 14 may then be readily inserted between bushings 24. Means for urging the first surfaces, namely the inner opposing faces of bushing 24, into bearing and gouging relation with the V-shaped protuberance which presents the second surfaces, such as a standard bolt 25 is then passed through the bores 26 and 19 of the bushings 24 and bearing inner race 16 respectively, and is secured by a locknut 27 in a conventional manner. It will be readily apparent that upon tightening the locknut 27 on bolt 25, said bolt and nut combination essentially serves as a clamping device, rather than its primary conventional function as a shear attachment in this general type of installation. The birfucated ends of bellcrank 10 flex sufficiently to permit this clamping action to take place. Tightening of locknut 27 on bolt 25 causes the annular V-shaped (knife-edge) configuration 17 on the bearing inner race ends to gouge or effect groove 28 (Figure 4) in the opposing surfaces of bushings 24, thus effecting a positive locking action between the bearing inner race 16 and bushings 24, and consequently, between the rod-end ball bearing 14 and bellcrank 10. Figure 4, which is drawn to a greatly enlarged scale, clearly illustrates this gouged out groove 28 in the lower surface of bushing 24, wherein the bearing inner race 16 and bushing 24 are shown separated for purposes of clarification. The depth of groove 28 in bushing 24 is proportional to the torque applied in securing the bolt and nut combination and the relative hardnesses of the two cooperating surfaces. Sufficient penetration of the annular V-shaped configuration 17 into the bushing 24 may be readily obtained with nominal torque values. As an example, a 70 inch-pound torque load applied to the bolt-locknut combination in a test set-up for this type joint construction caused sufficient penetration of the V-shaped configuration 17 into bushing 24 to enable the linkage to withstand a 15,000 pound tensile load before slippage occurred. If failure (slippage) of the bearing construction should occur under excessive, unpredicted loading conditions, the bolt and locknut combination is then capable of serving as a shear connection in a conventional manner.

Figure 4 further illustrates the clearances (somewhat exaggerated for clarification) which are imposed upon a joint construction of this general type by conventional, established manufacturing tolerances, assuming that standard parts (AN standard, NAS standard, etc.) are employed in this type joint construction, rather than employing press-fitted or closely-machined special parts. As an example, the diametral tolerance on a one-fourth inch diameter AN standard bolt 25 and the diametral tolerance on the bore 26 of a corresponding standard bushing 24 are such that dimension "a" may vary from .001″ to .006″, assuming the opposite sides of the bolt 25 and bushing 24 are in contact. In the same manner, the bolt's diametral tolerance and the diametral tolerance on the bore 19 of the rod-end ball bearing 14 are such that dimension "b" may vary from .001" to .004", also assuming the opposite sides of the bolt 25 and inner race 16 are in contact. In a conventional joint of this type employing an ordinary bearing, these tolerances are normally accumulative when the linkage is operating under loaded conditions, in either a tensile or compressive sense; one side of the bolt 25 will bear against the bushings 24 (Figure 2), while the bearing inner race 16 will bear against the opposite side of the bolt 25, so that using the standard tolerances cited above, it is possible to have .002" to .010" freedom or "play" in this conventional type of joint construction. Furthermore, this does not consider the fact that conventional anti-friction bearing devices normally have an internal radial clearance of from .001" to .005", which may also be accumulative, thereby permitting a total joint freedom of from .003" to .015". Anti-friction bearing devices employing the knife-edge locking principle of the present invention preferably have a close internal radial tolerance, on the order of .0002", so that substantially all "play" or blacklash may be eliminated from this type joint construction except for the very small internal radial clearance (.0002") in the bearing itself. The inherent physical characteristics of an anti-friction bearing employing the improved bearing construction readily permits rapid identification of such a close-internal-tolerance bearing, as opposed to an ordinary standard-tolerance bearing. To facilitate identification when such an anti-friction device (as a rod-end bearing) is installed in a joint of this type, a marking of some type, such as a letter "T" for "close-tolerance" (not shown) may be etched or stamped on the face or edge of the outer race of said bearing.

Figure 5:
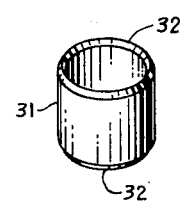
Figure 5 is a perspective view of the sleeve-type bushing shown in Figures 3 and 7, and further illustrates the construction of the present invention.

Figure 3 illustrates another type of pivotal joint construction embodying the improved bearing construction including the locking feature of this invention. In this instance, a clevis-type rod-end fitting 15 (Figures 1 and 3) is provided to pivotally connect the tubular member 13 to the tongued end of bellcrank 10. A plain cylindrical bushing 29 (Figure 3), fabricated of a self-lubricating material such as "oilite," is pressed into a vertically disposed and centrally located circular aperture 30 in the tongued end of bellcrank 10. This plain cylindrical bushing 29 is adapted to receive, in a close-fitting relationship, a cylindrical sleeve-type bushing 31 (Figures 3 and 5), preferably fabricated of hardened steel, which embodies the knife-edge locking principle of the present invention. The ends of this sleeve-type bushing 31 are symmetrically chamfered to effect an annular V-shaped protuberance or configuration 32, in the same manner as that heretofore described for the inner race 16 of the rod-end ball bearing 14 (Figures 2 and 4). The length of this sleeve-type bushing 31 (Figure 3) is such that the bifurcated ends of the clevis-type fitting 15 closely embrace said bushing 31 upon assembly. It is also necessary that at least the surface at the apex of the V-shaped protuberance 31 be of a hardness exceeding that of the cooperating surfaces of the ends of the fitting 15. A bolt 33, washers 34 and locknut 35 secure the assembly in a conventional manner, the bolt 33 passing through aligned and vertically disposed circular apertures 36 in the ends of the clevis fitting 15 and through the bore of the knife-edged bushing 31. Upon tightening the locknut 35 on bolt 33, the bifurcated end portions of the clevis fitting 15 flex sufficiently to permit a clamping action to take place, and the annular V-shaped ends 32 of bushing 31 gouge into and groove the inner opposing surfaces of the bifurcated end portions of the clevis-type rod-end fitting 15, in the same manner as heretofore described and illustrated in Figure 4. A positive locking action is thereby effected between the clevis fitting 15 and the tongued end of bellcrank 10, which construction permits no backlash. As previously described, it should be readily apparent that the bolt 33 and locknut 35 combine to serve only as a clamping device, while the shear load is assumed by the knife-edged bushing 31, which keys itself to the clevis fitting 15 through the annular V-shaped configuration or construction 32. The self-lubricating bushing 29 permits relative (rotational) motion between the bellcrank 10 and clevis fitting 15 without galling, since the knife-edged bushing 31 is keyed to and rotates with said clevis fitting 15, and is adapted to operate within bushing 29.

Figure 6:
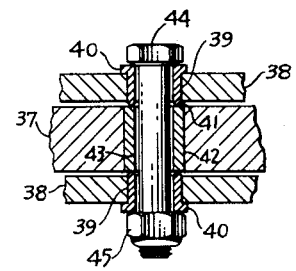
Figure 6 is a fragmentary detailed sectional view of a non-pivotal joint construction illustrating a pair of shoulder-type bushings which embody the knife-edge construction of the present invention, and adapted thereby to effect a precision connection between two fittings.

Figure 6 exemplifies another application of the knife-edge locking principle of the present invention. A non-pivotal joint construction is herein illustrated, as might be employed to effect a precision connection between two fittings, such a construction permitting no relative motion between said fittings. Only one connection is shown, whereas two or more are necessary to prevent rotation between the components as is well known in the art. A portion of one fitting 37 is shown clamped between the bifurcated portions of another fitting 38. The bifurcated portions of fitting 38 are circularly apertured 39 in an opposed and aligned manner, the apertures 39 each being adapted to have press-fitted therein a hardened steel shoulder-type bushing 40 which embodies an annular V-shaped configuration or construction 41 at its inner end. The V-shaped configuration 41 has adjacent the apex of the V a hardness greater than the hardness of any surface it bears on. The inner opposing ends 41 of these bushings 40 extend inwardly to a greater extent than the inner opposing surfaces of the bifurcated portions of fitting 38, so that the distance between these ends 41 is only slightly greater than the thickness of fitting 37 at this location. Fitting 37 is circularly apertured 42 to receive, in a press-fitted manner, a plain cylindrical bushing 43 which is substantially the same length as the thickness of fitting 37 in this region. (This bushing 43 may be omitted if the material from which fitting 37 is fabricated is of sufficient hardness to permit a slight gouging thereof by the V-shaped configuration 41.) A bolt 44 and nut 45 serve to secure the assembly as before, and as the clamping action takes place, the opposing V-shaped ends 41 of the hardened, flanged shoulder bushings 40 gouge grooves into the ends of the plain bushing 43 thereby immovably keying fittings 37 and 38 together. A variation of this construction (not shown) could employ a sleeve-type bushing embodying the knife-edge construction at each end (of the type shown in Figure 5), press-fitted in the central fitting (comparable to fitting 37 in Figure 6), and plain cylindrical bushings or plain shoulder bushings press-fitted in the bifurcated portions (comparable to fitting 38 in Figure 6), then secured in a similar manner to immovably lock the fittings together.

Figure 7:
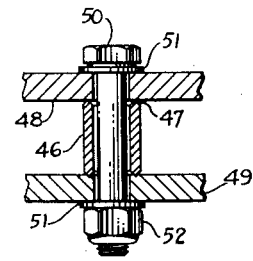
Figure 7 is a fragmentary detailed sectional view illustrating a sleeve-type bushing which embodies the knife-edge construction of the present invention, adapted to maintain two plates (or fittings, etc.) in a spaced relationship so no relative motion may exist between the components.

Referring now to Figure 7, still another application of the knife-edge locking principle is illustrated. A hardened, cylindrical sleeve-type bushing 46, terminating at each end in an annular V-shaped protuberance or knife-edge construction 47, is adapted to serve as a spacer to maintain two plates 48 and 49 (or fittings, etc.) in a spaced relationship. A bolt 50, washers 51 and nut 52 serve to assemble the components in a known conventional manner provides the required clamping action which causes the V-shaped ends 47 of bushing 46 to groove the inner opposing surfaces of plates 48 and 49, thereby locking the plates 48 and 49 against slippage with respect to each other.

The invention exemplifies an improved bearing construction, which is adapted to provide a means for effecting a non-backlash pivot or joint construction. This bearing construction may be readily embodied in anti-friction devices such as ball bearings, roller bearings, needle bearings and spherical (self-aligning) bearings, and in sleeve bushings, shoulder bushings and spacer-type bushings; being especially suited for employment in any precision mechanical linkage or other construction where the elimination of "play," "slop" or backlash is desirable.

As thus described, the Knif-Lok bearing construction of the present invention is characterized as an improved type of bearing construction, having the several novel features heretofore described, and adapted to provide a means for effecting a precision, non-backlash type of pivot or joint construction, and which provides a bearing construction capable of assuming radial loads without movement of the bearing relative to its mounting structure, and independent of its shaft or fastener size or clearances. Such an improved bearing construction eliminates the need for selective fits, and is readily adaptable to general shop or production-line techniques. It further provides assurance that anti-friction bearings employing this locking principle have their close internal radial clearance unaffected by assembly procedures.

Since other embodiments might be made of the present invention and inasmuch as many design changes might be made in the embodiments described, it is to be understood that the foregoing description and appended drawings are intended for exemplification of the invention only, and are not to be construed in a limiting sense.

I claim:

In a joint construction which is characterized by a first member having a pair of spaced apart portions and by a second member relatively movable with respect to said first member and fitted intermediate said spaced apart portions, the improvement comprising an elongated cylindrical element provided at each end with a knife-like bearing edge positioned to bear against said spaced apart portions of said first member, bearing means between said cylindrical element and said second member to afford connection and relative movement therebetween, and means relatively loosely fitted through said cylindrical element for forcibly urging said spaced apart portions and said cylindrical element together to thereby cause the knife-like edges of said cylindrical element to bite into said spaced apart portions whereby a locking action is effected therebetween which does not impair relative movement between said first member and said second member.

References Cited in the file of this patent

UNITED STATES PATENTS

| | | |
|---|---|---|
| 692,288 | Holdsworth | Feb. 4, 1902 |
| 1,044,055 | Johnson et al. | Nov. 12, 1912 |
| 1,365,532 | Mountain | Jan. 11, 1921 |
| 1,366,136 | Spracklen | Jan. 18, 1921 |
| 1,969,796 | Hoke | Aug. 14, 1934 |

FOREIGN PATENTS

| | | |
|---|---|---|
| 327,139 | Great Britain | Mar. 24, 1930 |
| 329,820 | Great Britain | May 29, 1930 |